Oct. 29, 1940.   W. L. HANSEN ET AL   2,219,388
LAMINATED PLATE CONSTRUCTION FOR CLOCKS
Filed March 18, 1938
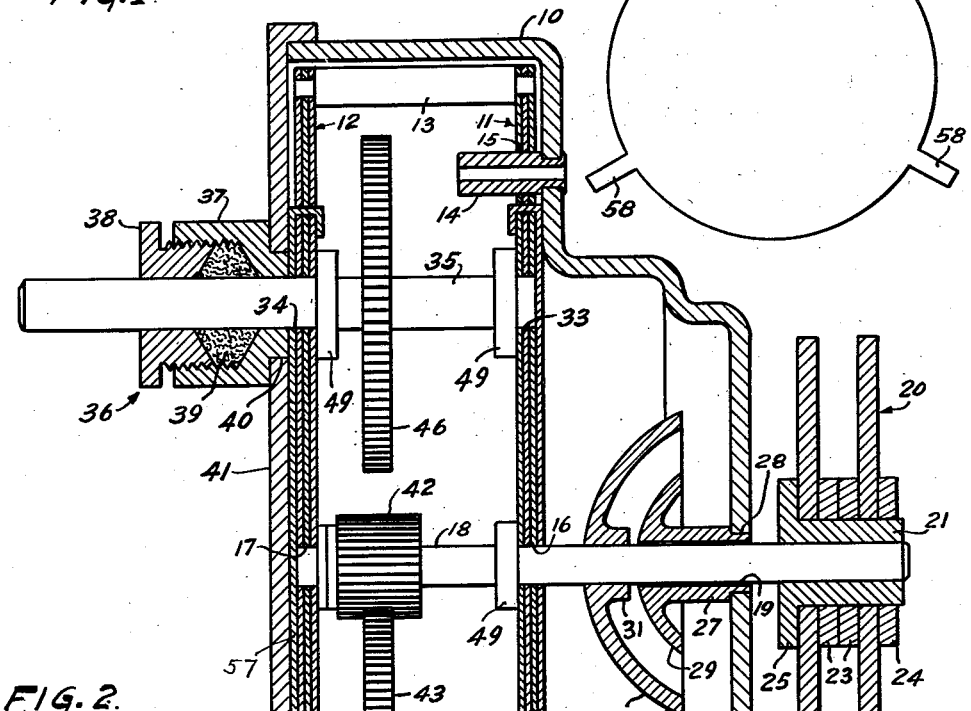
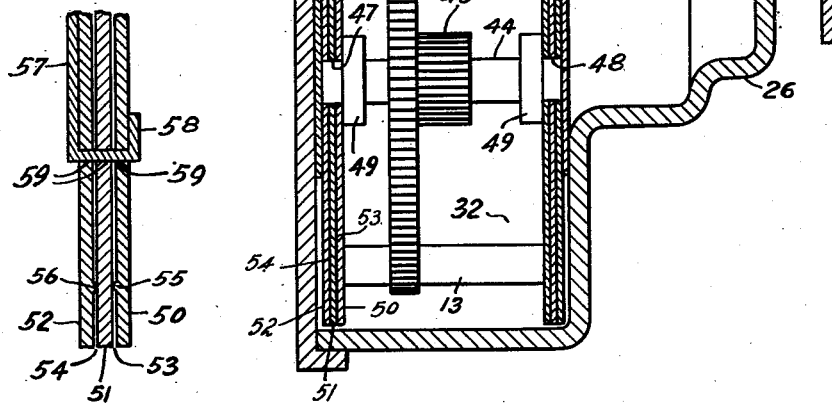
INVENTORS
WILLIAM L. HANSEN,
IRA N. HURST.
BY
Toulmin & Toulmin
ATTORNEYS Patented Oct. 29, 1940

2,219,388

UNITED STATES PATENT OFFICE 2,219,388

LAMINATED PLATE CONSTRUCTION FOR CLOCKS

William L. Hansen and Ira N. Hurst, Princeton, Ind., assignors to Hansen Mfg. Company, Princeton, Ind., a corporation of Indiana Application March 18, 1938, Serial No. 196,729

7 Claims. (Cl. 308—132)

This invention relates to clocks, and in particular, to devices for lubricating clock mechanisms.

One object of this invention is to provide means for lubricating the shaft bearings of clock mechanisms, not only at their ends but also at interior locations.

Another object is to provide such a lubricating means which also serves as structure to support the shafts themselves while conveying lubricant to them.

Another object is to provide a clock mechanism having shafts supported by end plates consisting of multiple laminations separated by narrow capillary intervals so that the oil in the clock mechanism casing rises through the capillary spaces not only to the ends of the bearings, but also to locations at a plurality of points along the bearing.

Another object is to provide a clock-supporting and lubricating structure, wherein the various shafts are supported by multiple lamination plates separated by capillary intervals, the plates being of such thin material as to be easily and accurately punched with the bearing apertures, yet in multiple assembly providing a sufficiently strong structure to support the mechanism shafts accurately and efficiently.

Another object is to provide a clock-mechanism-supporting and lubricating structure, consisting of multiple lamination plates separated by capillary intervals and held together by plate-like members having tongues passing through apertures in the plates, or around the edges thereof. These plates also preferably serve as end plates to prevent end play of the mechanism shafts.

In the drawing:

Figure 1 is a diagrammatic longitudinal section through the gear box of a clock connected to the rotor of an electrical synchronous clock motor, the various shafts being supported by multiple lamination plates separated by capillary intervals.

Figure 2 is an enlarged detail view of the end portion of one of the multiple laminated plate assemblies, showing the end plate tongue passing therethrough to hold the plates in assembly.

Figure 3 is a side elevation of one of the end plates having tongues for holding the lamination plates in assembly.

In general, the invention consists of a clock gear box containing intermeshing gearing mounted upon shafts, the bearings of which are provided in apertures formed in spaced plates. Each of these plates consists of three or more thin plates separated by capillary intervals, and held in that arrangement by suitable means. The plates extend downwardly into lubricant contained in the casing, whereby the lubricant rises in the capillary spaces between the lamination plates to lubricate not only the ends of the shafts but also the bearing itself in spaced points along its interior wall. The lamination plates in the embodiment shown in the drawing are held together by discs having tongues passing through the plates, or around their edges, and bent to hold the plates together. The capillary spacing may be provided by bending the plates slightly in order to provide tiny projections upon the opposite side, these projections serving to space the plates. Alternatively, very thin shims of capillary dimensions may be used to space the plates.

Referring to the drawing in detail, Figure 1 shows a casing 10, within which are mounted parallel supporting plate assemblies 11 and 12, separated by spacing posts 13. The casing 10 is provided with a tube 14 extending into the interior of the housing through the hole 15 in the supporting plate assembly 11. This tube serves the purpose of providing an inlet for the insertion of lubricant, and also as a ventilating aperture. Formed in the plate assemblies 11 and 12 are bearing holes 16 and 17 for supporting spaced portions of the rotor shaft 18, one end of which projects outwardly through an aperture 19 and carries a rotor, generally designated 20, on the end outside the casing 10. Any suitable form of rotor 20 may be used in connection with the invention, the form thereof being immaterial. The rotor 20 shown in the embodiment illustrated consists of a hub 21, having a pair of discs 22 of magnetic material, separated by spacing washers 23 and held in place by a disc or nut 24, urging these parts against the flange 25 on the hub 21.

The casing 10 is provided with a forwardly extending portion 26, which serves to inclose an oil trap for preventing the escape of oil from the interior of the housing 10 out to the rotor 20 along the rotor shaft 18. For this purpose there is provided a tubular stationary member 27, secured in the hole 28 in the casing portion 26, and having the previously mentioned aperture 19 through which the rotor shaft 18 passes outwardly. The tubular stationary member 27 is provided with a convex dished flange 29, which is spaced apart from a concavely dished member 30 having a hub 31 mounted upon the rotor shaft 18 for rotation therewith. Any lubricant escaping along the rotor shaft 18 from the lubricant chamber 32, between the supporting plates 11 and 12, will encounter the dished member 30 and will be thrown outwardly by centrifugal force along its convex surface. The lubricant is thereby thrown against the wall of the housing portion 26 and flows back into the chamber 32 instead of passing through the space between the oil trap members 29 and 30, and outwardly through the aperture 19. The oil trap device formed by the members 29 and 30 forms no part of the present invention, and is described and claimed in copending application, Ser. No. 138,866, filed April 24, 1937.

The supporting plate assemblies 11 and 12 are also provided with bearing apertures 33 and 34 for rotatably supporting the output shaft 35, generally known as the one R. P. M. shaft. This shaft communicates with the remainder of the mechanism for moving the hands of the clock, or other timing mechanism, and is frequently provided with a sweep hand which makes one revolution of the dial in one minute, thereby enabling seconds to be easily indicated. Surrounding the outer end of the output shaft 35 is a stuffing box, generally designated 36, and having a fixed member 37 within which is threaded an adjustable member 38 so as to compress a packing 39 arranged therebetween, and surrounding the output shaft 35. The stuffing box 36 has its stationary portion 37 mounted in a hole 40 provided in a cover plate 41, serving to cover the open side of the casing 10.

For purposes of simplifying the showing, only a portion of the clock mechanism has been shown because certain of the gears and their shafts fall on the adjacent side of the section plane upon which Figure 1 is taken. It is, of course, understood and obvious that an operative connection takes place through suitable gearing between the rotor shaft 18 and the output shaft 35. The gearing shown for purposes of illustration consists of a pinion 42, mounted upon the rotor shaft 18 and meshing with a gear 43 mounted upon the shaft 44. The shaft 44 also carries a pinion 45, which meshes with appropriate gearing connecting it operatively with the gear 46 mounted upon the output shaft 35. The shaft 44 is rotatably mounted in the bearing holes 47 and 48 in the supporting plate assemblies 12 and 11, respectively. In order to prevent excessive end play, the shafts 18, 35 and 44 are provided with collars 49 mounted thereon and serving to limit the endwise motion between the supporting plate assemblies 11 and 12.

Each of the supporting plate assemblies 11 and 12 consists of a plurality of thin plates of any convenient number, three being shown for purposes of illustration. As indicated in Figure 2, these three thin plates or lamination plates 50, 51 and 52 are separated by very narrow spaces 53 and 54, having widths of capillary dimensions. The plates may be maintained in spaced relationship by any suitable means, such as by the slight projections 55 and 56 shown on the lamination plates 50 and 52. The lamination plates 50, 51 and 52 may be held in assembly by any suitable means, the preferred means illustrated consisting of an end disc 57 (Figure 3), having tongues 58 extending outwardly therefrom. The end discs 57 serve to cover certain of the ends of the shafts 18, 35 and 44, and also serve to hold the lamination plates together by means of their tongues 58. The latter may be passed through apertures 59 in the plates 50, 51 and 52, and bent around against the inner plate 50 in the manner shown in Figure 2. Alternatively, the tongues 58 may be extended around the edges of the plates 50, 51 and 52 and similarly bent into their proper positions.

Ordinarily, it is very difficult to pierce thick metal plates with small apertures, especially by a punching process. In the present invention the applicants have eliminated this difficulty by providing laminated supporting plates 11 and 12, composed of thin plates which are easily and accurately punched. At the same time, these plates by their capillary separations, serve to cause the lubricant to rise not only to the ends of the shafts in their bearings, but also to locations along the interior walls of the bearings. In this manner the lubricant is attracted into the bearing at the internal points where it will be needed, rather than requiring the lubricant to move inwardly from the ends of the bearings.

As certain clock motor shafts rotate at very high speeds, the speed of the rotor shaft 18 being 3600 R. P. M., in some installations it will be seen that efficient lubrication is a vital requirement for long life and freedom from attention. By the present construction these advantages have been provided in a convenient and inexpensive way. At the same time the shaft bearings will be lubricated regardless of the angle to which the motor may be turned, because the lubrication takes place by capillary attraction. It is further unnecessary to employ any special plates for providing the capillary action because the provision of laminated supporting plates, according to the present invention, dispenses with the necessity for any other capillary lubricating plates.

The operation of the mechanism is self-evident from the foregoing description. The casing 10 is partially filled with lubricant, settling in the casing chamber 32. Due to the capillary spacing of the lamination plates 50, 51 and 52 of the supporting plate assemblies 11 and 12, the lubricant rises in the capillary intervals 53 and 54 (Figure 2) by capillary attraction into the bearing holes 16, 17, 33, 34, 47 and 48. Thus, these bearing holes are lubricated at internal points along their interior walls at precisely the points where lubricant is most needed, rather than at their ends.

It will be understood that we desire to comprehend within our invention such modifications as come within the scope of the claims and the invention.

Having thus fully described our invention, what we claim as new and desire to secure by Letters Patent is:

1. In a lubricating and supporting structure for mechanisms, a casing having a chamber with rotatable mechanism including shafts, laminated supports for said shafts, each support, including at least three thin spaced plates separated by capillary intervals and adapted to be accurately punched to provide accurate bearing apertures for said shafts, said plates having a plurality of sets of aligned holes, and clamping members abutting the ends of certain of said shafts and having portions extending through said aligned holes of the plates of each support for clamping said plates in capillary spaced relationship.

2. In a lubricating and supporting structure for mechanisms, a casing having a chamber with rotatable mechanism including shafts, laminated supports for said shafts, each support including at least three spaced plates separated by capillary intervals, said plates having a plurality of sets of aligned holes, and clamping members abutting said plates and having tongues extending through said aligned holes, the ends of said tongues being bent back toward the adjacent plate for clamping said plates in capillary spaced relationship.

3. In a lubricating and supporting structure for mechanisms, a casing having a chamber with rotatable mechanism including shafts, laminated supports for said shafts, each support including at least three spaced plates separated by capillary intervals, clamping plates abutting said supporting plates at the ends of certain of said rotatable shafts, and means for holding said clamping plates and said supporting plates in assembly.

4. In a lubricating and supporting structure for mechanisms, a casing having a chamber with rotatable mechanism including shafts, laminated supports for said shafts, each support including at least three spaced plates separated by capillary intervals, and clamping plates abutting said supporting plates adjacent the ends of certain of said rotatable shafts and having tongues extending therethrough for engaging and clamping said supporting plates in assembly.

5. In a lubricating and supporting structure for mechanisms, a casing having a chamber with rotatable mechanism including shafts, laminated supports for said shafts, each support including at least three spaced plates separated by capillary intervals, and clamping plates abutting one side of one of said supporting plates and having tongues bent around said supporting plates to hold said plates in assembly.

6. In a lubricating and supporting structure for mechanisms, a casing having a chamber with rotatable mechanism including shafts, laminated supports for said shafts, each support including at least three spaced plates separated by capillary intervals, and clamping plates abutting one side of said supporting plates and having tongues extending through apertures in said supporting plates and bent to hold said plates in assembly.

7. In a lubricating and supporting structure for mechanisms, a casing having a chamber with rotatable mechanisms including shafts, groups of laminated plates partly defining said chamber and having apertures therein forming bearings for said shafts, each of said bearings being formed by at least three spaced laminated plates separated from each other by capillary intervals communicating with said apertures, and closure plates abutting the outer plates of said groups and closing the bearing apertures in said plates toward the outside of said chamber.

WILLIAM L. HANSEN.
IRA N. HURST.